United States Patent
Grescini et al.

[11] 3,909,706
[45] Sept. 30, 1975

[54] METHOD FOR MEASURING A ROTATIONAL VELOCITY AND A GYROMETER FOR THE PRACTICAL APPLICATION OF SAID METHOD

[75] Inventors: Jean Grescini, Domene; Henri Gleñat, Biviers; Anteine Salvi, Fontaine, all of France

[73] Assignee: Commissariat a l'Energie Atomique, Paris, France

[22] Filed: Sept. 5, 1973

[21] Appl. No.: 394,415

[30] Foreign Application Priority Data
Sept. 20, 1972 France .............................. 72.33326

[52] U.S. Cl. .............................. 324/.5 E; 324/.5 R
[51] Int. Cl.² .......................................... G01Y 33/08
[58] Field of Search ................... 324/.5 R, .5 E, .5 F

[56] References Cited
UNITED STATES PATENTS
| | | | |
|---|---|---|---|
| 3,103,624 | 9/1963 | Greenwood | 324/.5 R |
| 3,149,276 | 9/1964 | Hirsh | 324/.5 R |
| 3,495,163 | 2/1970 | Salvi | 324/.5 E |

*Primary Examiner*—Alfred E. Smith
*Assistant Examiner*—Michael J. Tokar
*Attorney, Agent, or Firm*—William D. Stokes

[57] ABSTRACT

A homogeneous and steady directing magnetic field is produced in the direction about which a rotational velocity is to be measured. An electrical signal is delivered by a nuclear magnetic resonance magnetometer probe which is placed in the magnetic field and rotates at said velocity. The difference between the frequency of the signal and the detected frequency of resonance or reference frequency serves to determine the value of rotational velocity.

16 Claims, 3 Drawing Figures

METHOD FOR MEASURING A ROTATIONAL VELOCITY AND A GYROMETER FOR THE PRACTICAL APPLICATION OF SAID METHOD

This invention relates to a method for measuring a rotational velocity and to a gyrometer for carrying out said method. One application for which the invention is of special interest is inertial navigation of aircraft, probe missiles, satellites and the like.

It is known that certain atomic nuclei have properties which permit the pratical development of angular-motion detectors; their inherent angular momentum (spin) is sensitive to gyroscopic effects and their magnetic moment which is proportional to the angular momentum permits detection of movements by electromagnetic methods.

The use of nuclear magnetic resonance has permitted the construction of gyrometers based on the equivalence between a magnetic field and a rotation in a spin system. Analysis of motion of spins shows in fact that the influence of a rotation of vector $\vec{\Omega}$ is identical with that of a magnetic field $\vec{H}$ such that $\vec{\Omega} = \gamma \vec{H}$, $\gamma$ being the gyromagnetic ratio of the spins. In order to measure a rotation, a magnetic field $\vec{H}o$ known as a directing field is therefore generated and a nuclear magnetic resonance probe is placed in said directing field. The probe is rigidly fixed to the apparatus whose rotation is to be measured. It is then possible to have two types of apparatus:

the rotation is parallel to the directing field $\vec{H}o$; this accordingly results in modification of the Larmor frequency which starts at $\omega = \gamma\, Ho$ and becomes $\omega' = \gamma\, Ho + \Omega$. The measurement of $\Omega$ becomes a measurement of frequency variation;

the rotation is perpendicular to the directing field $\vec{H}o$; it is then necessary to superimpose an alternating magnetic field on the directing field $\vec{H}o$; this arrangement results in the so-called "nuclear induction" gyrometer.

The gyrometer of the present invention is related to the first of these two types. In the corresponding devices of the prior art, the measurement of the frequency variation caused by the rotation is performed by comparing the angular frequency $\omega' = \gamma\, Ho + \Omega$ with that of a reference signal derived from an external oscillator; in point of fact, the directing field to which the probe is subjected is perturbed by ambient stray fields (terrestrial magnetic field, field of adjacent masses and so forth), with the result that the frequency $\omega'$ includes both the gyromatic information (by means of the term $\Omega$) and the fluctuations of a magnetic nature (by means of the term $\gamma\, Ho$). The magnetic shielding of the probe naturally reduces the error committed but does not make it possible to avoide the error completely.

The precise aim of the invention is to provide a method for measuring a rotational velocity and a gyrometer which eliminate the errors arising from the existence of stray magnetic fields. In order to obtain this result, the reference frequency with which the frequency $\gamma\, Ho + \Omega$ is compared is not obtained from an external oscillator but is the actual frequency of the nuclear magnetic resonance of the probe employed, namely $\gamma\, Ho$. This frequency can be measured by means of the oscillation frequency of a nuclear spin coupling oscillator which is constituted by a magnetometer probe and suitable circuits. The frequency $\gamma\, Ho$ is insensitive to the rotation and takes account of the real magnetic field $Ho$ in which the measuring probe is placed. The difference in the frequencies $\gamma\, Ho + \Omega$ and $\gamma\, Ho$ therefore gives the desired rotational velocity $\Omega$ which no longer depends on the fluctuations in the directing field.

More precisely, this invention is directed to a method for measuring a velocity of rotation about an axis in which the value of said rotational velocity is deduced from the difference between the frequency of the electrical signal delivered by a magnetic-resonance magnetometer probe which is driven at said rotational velocity and a reference frequency, characterized in that said reference frequency is the frequency of said magnetic resonance.

Said probe preferably employs the nuclear magnetic resonance phenomenon; another preferred arrangement consists in producing at the level of said probe a homogeneous steady magnetic field having a constant direction with respect to said probe.

This invention is also directed to a gyrometer which carries out the method hereinabove defined and comprises means for producing a homogeneous steady directing magnetic field in the direction about which the rotational velocity is intended to be measured and a nuclear magnetic resonance magnetometer probe disposed in said magnetic field, characterized in that it comprises means for detecting the frequency of said nuclear magnetic resonance and means for measuring the difference between the frequency of the electrical signal delivered by said probe and said frequency of resonance.

In a gyrometer of this type, it is necessary to obtain both the reference signal at the frequency $\gamma\, Ho$ and the gyromagnetic signal at the frequency $\gamma\, Ho + \Omega$. It is endeavored to employ a magnetometer of the nuclear spin coupling oscillator type in order to deliver a reference signal which is independent of the rotation about an axis at a velocity which is to be measured. To this end, the axis of the coils employed for collecting the useful signal must be placed along said measuring axis; in order that the magnetometer should nevertheless be capable of supplying a signal at the frequency $\gamma\, Ho$, it is necessary to ensure that said measuring axis is not forbidden; by forbidden axis is meant an axis which makes the probe insensitive to a magnetic field when the axis is parallel to said field. The probe of the reference magnetometer which is employed in the gyrometer in accordance with the invention is therefore without any forbidden axis and will be designated hereinafter by the expression "isotropic probe."

In order to obtain the gyromagnetic signal at the frequency $\gamma\, Ho + \Omega$, it is also possible to employ a magnetometer of the spin oscillator type in which the axis of the coils for collecting the useful signal is located at right angles to the measuring axis; provision can therefore be made for a second isotropic probe which is similar to the first, has a perpendicular axis and constitutes with this latter a second pin oscillator. A differential frequency meter to which the signals of the two spin oscillators are applied and a system for regulating the intensity of the directing field based on a comparison between the frequency of the first spin oscillator and the frequency of a reference oscillator completes the gyrometer.

However, in a preferred alternative embodiment of the invention, the reference magnetometer which is again of the nuclear spin coupling oscillator type comprises an isotropic uniaxial probe having an axis parallel to said directing field and the gyrometer further comprises:

at least one coil having an axis at right angles to the directing field, means for amplifying the voltage which appears at the terminals of said coil at the angular frequency $\omega'$ which is responsive to said rotation, means for measuring the difference between the frequency $\omega'$ and the frequency $\omega$ of the reference magnetometer.

Instead of a single coil, use is preferably made of two half-coils placed symmetrically on each side of said probe and connected in such a manner that the useful signals are added.

In an alternative embodiment, the second magnetometer is thus replaced by a single winding, said winding being subjected to the precession of the nuclear spins of the first magnetometer which induce therein an alternating signal at the reference and being responsive to the rotation of the gyrometer about the directing axis.

The characteristic features and advantages of the invention will become more readily apparent from the following description of one exemplified embodiment which is given by way of explanation and not in any limiting sense, reference being made to the accompanying drawings, in which.

As has already been stated in the definition of the invention, the gyrometer can advantageously make use of an isotropic uniaxial probe. This probe contains a large number of elements which are described in French Pat. Application filed by the present Applicant on July 22nd, 1970 under No. EN 7027009 in respect of a "Nuclear magnetic resonance magnetometer." For all details relating to this isotropic probe, reference can therefore be made to this patent application, whose U.S. counterpart is U.S. Pat. 3,735,246. The constructional design of a probe of this type will be briefly recalled with the aid of FIGS. 1 and 2.

Figure 1:
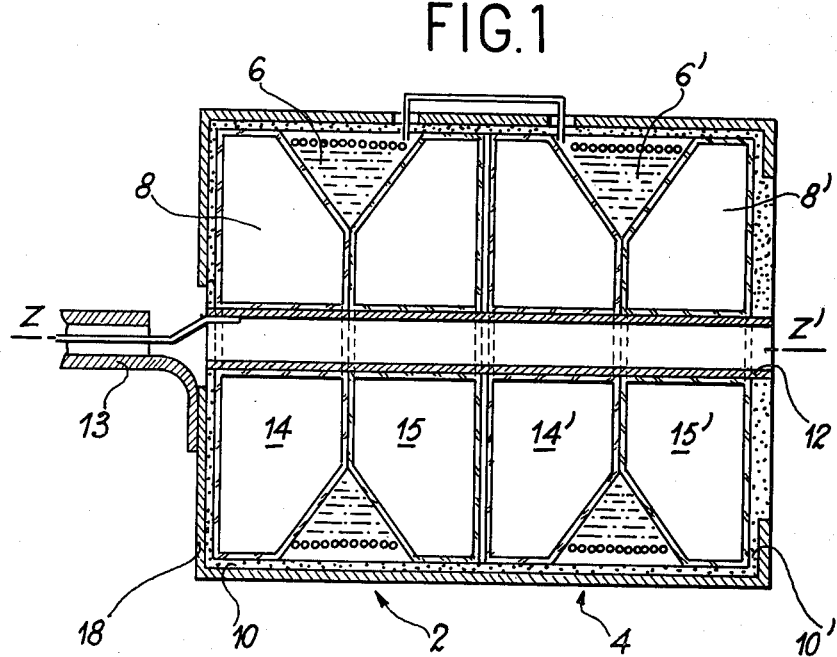
FIG. 1 is a diagrammatic sectional view of an isotropic probe which is employed in the gyrometer in accordance with the invention.

An isotropic probe is shown in diagrammatic section in FIG. 1. The probe is made up of two similar assemblies 2 and 4 which are aligned along the axis ZZ'; each assembly is composed of a half-coil 6 and 6' which surrounds the samples 8 and 8'; the half-coils 6 and 6' can have any cross-sectional shape and especially a triangular shape; the samples are contained in two separate vessels 10 and 10' which can advantageously be designed in the form of two symmetrical flasks having the references 14 and 15, 14' and 15' respectively so that, when placed in juxtaposed relation, they define a space in which the two half-coils 6 and 6' can be fitted. The resonant excitation cavity comprises a conductor 12 which is connected to the initial conductor of the coaxial cable 13 and an outer casing 18.

The samples 8 and 8' are each composed of a solvent which possesses a nuclear spin and a paramagnetic substance which is dissolved in said solvent; this latter establishes the gyromagnetic ratio $\gamma$ of the nuclei and the resonant frequency $\omega = \gamma$ Ho of said nuclei in a field having an intensity Ho.

The nuclear spin which is employed is usually derived from protons but it is also possible to employ different nuclei, in particular the nuclei of phosphorus and of fluorine. In the first case, the solvent usually consists of a hydrogenated liquid. The paramagnetic substance can be constituted by an iron or by a free radical possessing an unpaired electron ion interaction with an atomic nucleus of the substance. The nature of these samples is so determined as to take advantage of the dynamic polarization phenomenon or Overhauser-Abragam effect which utilizes dipole coupling between the spin of the nucleus of the solvent and the spin of an electron belonging to the paramagnetic substance. Polarization is obtained by pumping by means of a very-high-frequency field and saturating the electron paramagnetic resonance line of said substance.

In isotropic uniaxial probes such as the probe shown in FIG. 1, the measuring and injection coils 6 and 6' are wound in opposite directions so that the spurious signals induced therein counterbalance each other; on the contrary, the useful signals derived from the electromotive forces produced by the nuclear resonance phenomena are added to each other. This result is achieved, however, only if the macroscopic resultant of the magnetic moments of the nuclei of one of the samples is opposed to the macroscopic resultant of the magnetic moments of the nuclei of the other sample. In the embodiment illustrated in which provision is made for only one very-high-frequency excitation source, these opposite effects must take place in response to an excitation which occurs at the same frequency in the case of both samples. To this end, use is made of two samples in which the paramagnetic substances are different, for example, and in which two reversed electron paramagnetic resonance lines are exhibited substantially at the same excitation frequency. Thus in the case of one of the samples (sample 8, for example), saturation by the electromagnetic field produces an increase in absorption at the nuclear resonance frequency and in the case of the other sample (sample 8', for example), saturation of the electron resonance line produces a stimulated emission at the nuclear magnetic resonance frequency.

Figure 2:
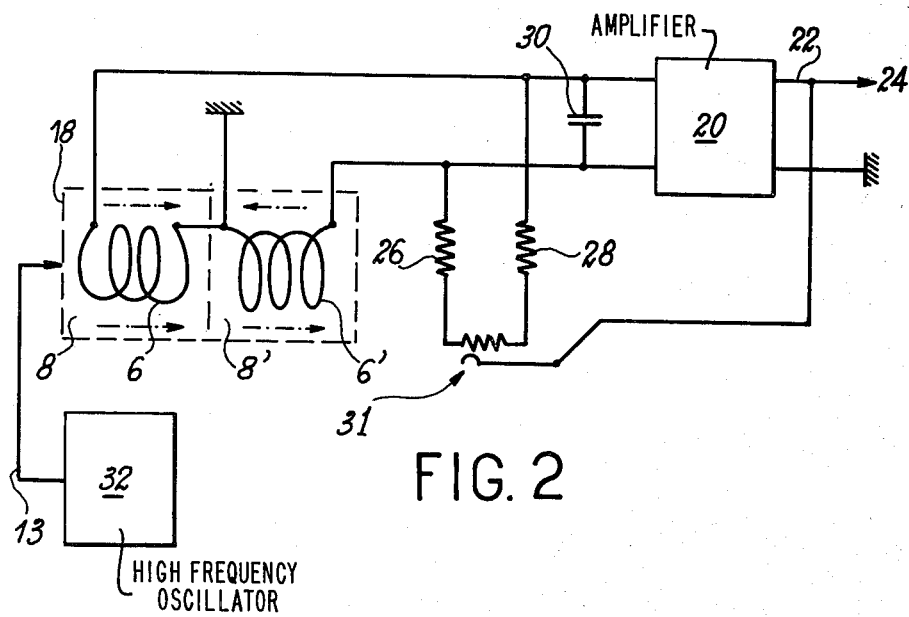
FIG. 2 is a circuit diagram of a probe of this type.

FIG. 2 is the circuit diagram of an isotropic uniaxial probe which corresponds to FIG. 1 and is mounted as a nuclear spin coupling oscillator. One of the ends of the two half-coils 6 and 6' is grounded; the other ends are connected to the inputs of a loop amplifier 20; a tuning capacitor 30 is mounted between the ends of the coils 6 and 6' so as to endow the input circuit of the amplifier 20 with a suitable Q-factor. The output signals of the amplifier 20 are partially re-injected into the half-coils 6 and 6'; to this end, the output 22 of the amplifier 20, said output being also connected through the lead 24 to devices which are not illustrated, is closed on the inputs by means of two resistors 26 and 28 having equal and high values of resistance with respect to the impedance of the half-coils 6 and 6'. In order to permit accurate balancing of the probe, the output 22 is connected to the resistors 26 and 28 through a potentiometer 31.

The electron paramagnetic resonance lines of the samples 8 and 8' are excited by a single very-high-frequency oscillator 32 which is connected to the resonant cavity 18 by means of the coaxial cable 13.

The probe which has just been described behaves differently according as it is placed in a magnetic field which is either perpendicular or parallel to its axis:

1. The magnetic field is perpendicular to the axis of the probe: the precession of the macroscopic resultant $\vec{M}$ of the nuclear spins induces within the measuring coils an electromotive force E which can be represented, if $\omega$ is the Larmor frequency, by:

$$E = K \; |\vec{M}| \; \omega \cos \omega t$$

If the probe is driven in a movement of rotation in the plane at right angles to $\vec{H}o$, although the spin precession frequency remains constant, the frequency of the induced electromotive force changes and produces the image of a virtual field affected by the angular velocity imparted to the probe. Thus, the preceding expression becomes:

$$E' = K \; |\vec{M}| \; \omega' \cos \omega' t \text{ with } \omega' = \omega + \Omega$$

2. The magnetic field is parallel to the axis of the probe: in this case, the rotation parallel to the field $\vec{H}o$ does not induce any frequency variation. The coil system always presents the same reference system to the rotating vector $\vec{M}$ and the output voltage retains its frequency $\omega$.

In accordance with a first alternative embodiment of the invention, it is therefore possible to place two probes in a homogeneous and steady directing field $\vec{H}o$, the axis of one probe being parallel to $\vec{H}o$ and the axis of the other probe being perpendicular to $\vec{H}o$. The first probe supplies the reference signal at the frequency $\omega$ and the second probe supplies the signal at the frequency which contains the gyrometric information, namely $\omega' = \omega + \Omega$. The difference between the frequencies of the signals emitted by said two probes supplies the rotational velocity $\Omega$ about a directing field. This two-probe device can in fact be simplified since it is possible in an advantageous alternative embodiment of the invention to collect the signal containing the gyrometric information from a probe having an axis which is parallel to the directing field; the corresponding gyrometer is illustrated in FIG. 3.

There is again shown in this figure an isotropic uniaxial probe which is oriented along the axis ZZ' and corresponds to the probe described earlier in connection with FIG. 1, the same elements being designated by the same reference numerals; the circuits of the nuclear oscillator at the frequency $\omega$ are represented only by the loop amplifier 20. A steady and homogeneous magnetic field $\vec{H}o$ is produced by means of a coil 40 along the axis ZZ' about which the velocity of rotation is to be measured, said coil being wound on a coil former 43 and supplied by a direct-current source (not shown). A winding 41 or so-called regulating winding is coaxial with the coil 40. A group of half-coils 42 and 42' is placed along the axis XX' at right angles to the axis ZZ'; the two half-coils 42 and 42' are located on each side of the probe and placed at a sufficiently short distance from this latter to ensure that the field lines of the nuclear spins represented by the chain-dotted lines 45 and derived from the samples 8 and 8' pass through said half-coils. The voltage at the frequency $\omega'$ which appears at the terminals of the coils 42 and 42' is amplified by the amplifier 44; the two inputs of a frequency-comparing circuit 46 or phase comparator are connected respectively to the loop amplifier 20 and to the amplifier 44; the output of said circuit constitutes the measuring output 48 of the gyrometer. Moreover, a frequency comparator 50 receives at one of its inputs a signal derived from a reference oscillator 52 and at the other input a signal at the frequency $\omega$ which is collected from the nuclear oscillator at the output of the loop amplifier 20. A correcting signal which supplies the regulating winding 41 appears at the output of the comparator 50.

Figure 3:
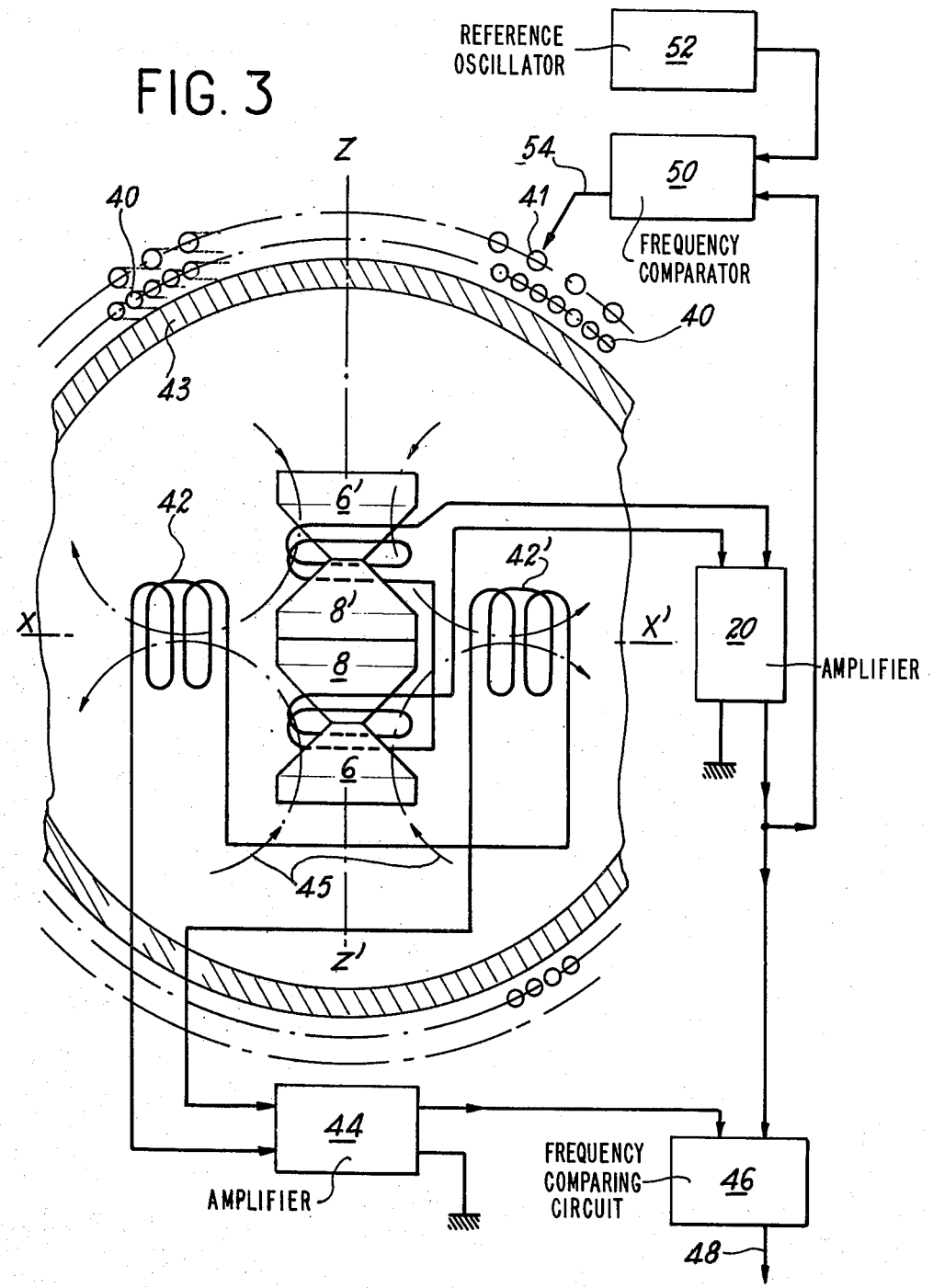
FIG. 3 is a general diagram of the gyrometer according to the invention.

The operation of the gyrometer which is illustrated in FIG. 3 is as follows. Apart from any rotation about the axis ZZ', the electromotive force is induced in the coils 42 and 42' at a frequency $\omega'$ which is identical with the nuclear precession frequency $\omega$. The strict equality between $\omega$ and $\omega'$ permits a perfect zero adjustment on the output lead 48 of the comparator 46. When the probe is driven in a movement of rotation about the axis ZZ' at an angular velocity $\Omega$, the signal collected from the nuclear oscillator retains its frequency $\omega$ but the frequency of the signal induced in the coils 42 and 42' is found to drift to the value $\omega' = \omega + \Omega$. A comparison in the circuit 46 between the frequencies $\omega$ and $\omega'$ immediately gives the angular velocity $\Omega$ which appears on the output lead 48.

In an improved alternative design of the gyrometer, the independence of the frequency $\omega$ of the nuclear oscillator with respect to the gyromagnetic effects is utilized in order to stabilize the amplitude Ho of the directing magnetic field. To this end, the frequency $\omega$ of the nuclear signal is compared within the comparator 50 with the frequency of the reference oscillator 52. If the frequency $\omega = \gamma$ Ho of the nuclear oscillator varies, this is the sign of a variation of the magnetic field Ho; the comparator 50 then generates a current which supplies the regulating winding 41 in a direction such that the directing magnetic field is restored to its initial value.

As has been explained earlier, the isotropic uniaxial probe is of the dynamic polarization type and presupposes the existence of a common frequency for the electron paramagnetic resonance lines of the samples 8 and 8' contained therein. These samples are placed in a magnetic field which is the directing field; the frequencies of the electron resonance lines therefore depend on the amplitude of said field since this latter modifies the hyperfine structure of the paramagnetic substance. The pair of samples employed within the probe is therefore dependent on the value which is chosen for the directing magnetic field.

If a weak directing magnetic field is chosen, the pair of samples employed can consist in one case of a solution of TANO (triacetonamine nitroxide) in dimethoxyethane and in the case of the second sample, of a $10^{-3}$ solution of TANO in methanol. The common frequency is the in the vicinity of 62.6 Mc/s.

Since the amplitude of the nuclear signal is a function of the magnetic field Ho, it is nevertheless advantageous to construct a gyrometer in which Ho is as strong as possible. The pair of samples used above is no longer suitable in this case. The present Applicant has found pairs of samples which make it possible to work at an amplitude of the directing field which is greater than that of the terrestrial magnetic field. For example, in the case of a directing field of 2.5 Oe, the following pair is well suited: in the case of the first sample, the solvent is nonane in which is dissolved deuterated TANO at a concentration of $10^{-3}$ M; the second sample consists of 50 % acetone and 50 % water in which is dissolved deuterated DTBN (diterbiobutylnitroxide) at a concentration of $10^{-3}$ M; the common excitation frequency is in this case in the vicinity of 65.5 Mc/s.

The directing field $\vec{H}_o$ can be supplied by a winding formed by a conductor wound on a spherical coil former, for example of pyrex having a low coefficient of expansion. The inhomogeneity of the magnetic field can be made less than $10^{-5}$ for 60 % of the useful volume. In the case in which high angular precision is called-for, a magnetic screen which surrounds said sphere ensures a considerable reduction in the perturbations to be corrected.

This invention is not limited to the gyrometer as described in the foregoing in which a steady magnetic field or so-called directing field is produced at the level of the probe.

In fact, the gyrometer continues to provide effective operation whenever the apparatus is placed in a nonzero magnetic field such as the terrestrial field, for example.

In the case just mentioned, a particularly advantageous application is the compensation of the gyromagnetic effect in the measurement of magnetic field by a magnetic resonance magnetometer which is attached to a moving carrier such as an aircraft, for example: it is in fact essential in such a case to measure the velocity of rotation of said carrier about the magnetic field lines in order to obtain the error signal; the gyrometer in accordance with the invention is wholly adapted to this measurement and is integrated in a device in accordance with French Pat. No EN 7112816 of Apr. 9th, 1971, whose U. S. counterpart is U.S. Patent No. 3,823,364.

Furthermore, a gyrometer which is similar to the device hereinabove described and makes use of the electron magnetic resonance phenomenon (deduced, for example, from an optical pumping magnetometer) also forms part of the invention.

What we claim is:

1. A gyrometer comprising:
   means for producing a homogeneous, steady directing magnetic field $H_o$ in the direction about which a rotational velocity is to be measured;
   means including a magnetic resonant material disposed to rotate in said field at said velocity for generating during rotation a first electrical signal having frequency $\omega$, where $\omega$ equals the Larmor frequency of said material $\gamma H_o'$, where $H_o'$ equals $H_o$ plus any external perturbational field components;
   means disposed to rotate in said field for generating during rotation a second electrical signal having frequency $\omega'$, where $\omega'$ equals $\gamma H_o'$ plus said rotational velocity; and
   means for measuring the difference between the frequency $\omega'$ of said second signal and the frequency $\omega$ of said first signal.

2. A gyrometer according to claim 1 wherein said means for generating a first electrical signal comprises a nuclear spin coupling oscillator including a first isotropic magnetometer probe for developing a nuclear magnetic resonance signal; said probe including two collecting windings having a common axis parallel to said directing field for collecting said nuclear magnetic resonance signal.

3. A gyrometer according to claim 2 wherein said means for generating a second electrical signal comprises a second magnetometer probe including at least one coil, said coil having its axis perpendicular to said directing field.

4. The gyrometer of claim 2 wherein said means for generating a second electrical signal comprises at least one coil having an axis at right angles to said directing field and coupled inductively to said oscillator; and means for amplifying the voltage developed by said coil.

5. A gyrometer according to claim 4 wherein said coil is divided into two half-coils placed symmetrically on each side of said probe and connected to add the useful signals.

6. A gyrometer according to claim 2 wherein said first magnetometer probe is of the dynamic polyarization type and includes:
   two samples each composed of a solvent which possesses a nuclear spin and a paramagnetic substance including a chemical radical dissolved in said solvent, said samples being such that, taking into account the directing magnetic field in which they are placed, each sample possesses an electron paramagnetic resonance line at a common frequency, the saturation of said line being intended to produce in the case of one of said samples an increase in the absorption of energy at the nuclear magnetic resonance frequency and in the case of the other sample an emission of energy at said nuclear magnetic resonance frequency; and
   means for producing a pumping electromagnetic field at said common frequency.

7. A gyrometer according to claim 6, wherein the radical of one of the samples is deuterated TANO dissolved in nonane at a concentration of $10^{-3}$ M and in which the radical of the other sample is deuterated DTBN dissolved in a 50% mixture of acetone and water and at a concentration of $10^{-3}$ M, the amplitude of the directing field being in the vicinity of 2.5 Oersteds and the common pumping frequency being in the vicinity of 65.5 Mc/s.

8. A gyrometer according to claim 1, wherein said means for producing the directing magnetic field includes an insulating spherical coil former; a spherical coil wound on said former; and a direct-current source for supplying said coil.

9. A gyrometer according to claim 1, wherein said spherical coil is surrounded by a magnetic screen.

10. A gyrometer according to claim 1, wherein said means for producing the directing magnetic field comprises a regulating winding having an axis parallel to the directing field; a regulating circuit for supplying said regulating winding; said regulating circuit comprising an oscillator at a reference frequency; and a frequency comparator having one input connected to said reference oscillator, a second input connected to said means for generating a first electrical signal of frequency $\omega$; and an output, said output delivering a correcting signal to said regulating means.

11. A method of measuring the rotational speed of a body in motion about an axis comprising the steps of:
   attaching to said body in motion a magnetic resonance magnetometer probe;
   inserting said body and probe into a continuous and homogeneous magnetic field $H_o$ said probe oriented such that a single signal having the single frequency $\omega'$ is produced by said probe; $\omega'$ equalling $\gamma H_o'$ plus the rotational velocity where $H_o'$ equals $H_o$ plus any external perturbational field components;

developing a signal having the frequency $\omega$ where $\omega$ equals $\gamma H_o'$; and measuring the difference between the frequencies $\omega$ and $\omega'$ to derive the value of said speed of rotation.

12. The method of claim 11 wherein said probe operates on the principle of nuclear magnetic resonance.

13. The method of claim 11 wherein said magnetic field is produced by biasing apparatus associated with said probe.

14. The method of claim 11 further including the step of supplying said value as an error signal for use in correcting magnetometer measurements made by a rotating magnetometer carrier.

15. A method of measuring the rotational speed of a body in motion about an axis comprising the steps of:

attaching to said body in motion a magnetic resonance magnetometer probe;

inserting said body and probe into a continuous and homogeneous magnetic field $H_o$, said probe being oriented such that a signal having the frequency of magnetic resonance $\omega$ is produced by said probe, where $\omega = \gamma H_o'$ where $H_o'$ plus any external perturbational field components;

developing a signal having the frequency $\omega' = \gamma H_o'$ plus the said rotational speed from said probe by induction; and measuring the difference between the frequencies $\omega$ and $\omega'$ to derive the value of said rotational speed.

16. A method of measuring the rotational speed of a body in motion about an axis of rotation comprising the steps of:

attaching to said body a magnetic resonance magnetometer probe producing a single Larmor frequency;

attaching to said body at least one coil, said coil being positioned such that its axis is perpendicular to the axis of rotation and such that said coil is inductively coupled to said probe;

inserting said body, prove and said at least one coil into a continuous and homogeneous magnetic field $H_o$ such that the axis of said probe is parallel to the axis of said magnetic field;

detecting the electrical signal delivered by said probe wherhe $\omega = \gamma H_o'$, $H_o'$ being equal to $H_o$ plus any perturbational fields;

detecting the electrical signal $\omega' = \omega$ plus said rotational speed induced in said at least one coil by said probe; and detecting the difference between the frequency of said signal delivered by said probe and the signal induced in said at least one coil.

* * * * *

UNITED STATES PATENT OFFICE
CERTIFICATE OF CORRECTION

Patent No. 3,909,706  Dated September 30, 1975

Inventor(s) Jean Crescini, Henri Glenat and Antoine Salvi

It is certified that error appears in the above-identified patent and that said Letters Patent are hereby corrected as shown below:

Page 1, Inventors' names:
"Jean Grescini" should be --Jean Crescini--; and
"Anteine Salvi" should be --Antoine Salvi--.

Col. 1, line 50, "gyromatic" should be --gyrometric--.

Col. 1, line 54, "avoide" should be --avoid--.

Col. 2, line 59, "pin" should be --spin--.

Col. 3, line 21, after "reference", insert --frequency--.

Col. 4, line 8, "iron" should be --ion--.

Col. 4, line 9, "ion" should be --in--.

Col. 5, line 47, "numberals" should be --numerals--.

Col. 6, line 53, after "$10^{-3}$", insert --M--.

Col. 9, claim 15, line 24, after "$H'_o$", insert --equals $H_o$--.

Col. 10, claim 16, line 14, "prove" should be --probe--.

Signed and Sealed this twenty-third Day of December 1975

[SEAL]

Attest:

RUTH C. MASON
Attesting Officer

C. MARSHALL DANN
Commissioner of Patents and Trademarks